US011092559B2

(12) United States Patent
Ando et al.

(10) Patent No.: US 11,092,559 B2
(45) Date of Patent: Aug. 17, 2021

(54) THERMAL HUMIDITY MEASURING DEVICE

(71) Applicant: Hitachi Automotive Systems, Ltd., Hitachinaka (JP)

(72) Inventors: Ryo Ando, Hitachinaka (JP); Hiroshi Onuki, Hitachinaka (JP); Hiroshi Nakano, Tokyo (JP); Takeo Hosokawa, Hitachinaka (JP); Masayuki Hio, Hitachinaka (JP); Shigenobu Komatsu, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 255 days.

(21) Appl. No.: 16/315,424

(22) PCT Filed: Jul. 4, 2017

(86) PCT No.: PCT/JP2017/024429
§ 371 (c)(1),
(2) Date: Jan. 4, 2019

(87) PCT Pub. No.: WO2018/037721
PCT Pub. Date: Mar. 1, 2018

(65) Prior Publication Data
US 2019/0310212 A1    Oct. 10, 2019

(30) Foreign Application Priority Data
Aug. 26, 2016 (JP) .............................. JP2016-165304

(51) Int. Cl.
*G01N 25/56* (2006.01)
*G01N 25/64* (2006.01)
(Continued)

(52) U.S. Cl.
CPC ............. *G01N 25/56* (2013.01); *G01F 1/696* (2013.01); *G01F 1/86* (2013.01); *G01K 7/00* (2013.01);
(Continued)

(58) Field of Classification Search
CPC ........ G01N 25/56; G01N 25/58; G01N 25/60; G01N 25/62; G01N 25/64; G01N 25/66;
(Continued)

(56) References Cited

U.S. PATENT DOCUMENTS 4,966,037 A * 10/1990 Sumner ................... G01F 1/696
438/52
2011/0107832 A1    5/2011 Sakuma
(Continued)

FOREIGN PATENT DOCUMENTS

JP    H07-113777 A    5/1995
JP    10-104183 A    4/1998
(Continued)

OTHER PUBLICATIONS

International Search Report (with English Language Translation) and Written Opinion (Japanese Language only) issued in PCT/JP2017/024429 dated Oct. 17, 2017.

*Primary Examiner* — Herbert K Roberts
(74) *Attorney, Agent, or Firm* — Foley & Lardner LLP

(57) ABSTRACT

A thermal humidity measuring device includes first and second heating elements, and is capable of obtaining a plurality of measurement values (measured values) by effectively utilizing each of the heating elements, which includes measuring humidity by the first heating element. A thermal humidity measuring device includes a first bridge circuit that includes a first heating element that senses humidity, and a second bridge circuit that includes a second heating element that heats air around the first heating element. In the thermal (Continued)

humidity measuring device, a first output signal is extracted from the first bridge circuit, and the humidity is sensed. A second output signal is extracted from the second bridge circuit, and the second output signal includes information relating to at least any one of pressure, an air flow rate, and air temperature.

8 Claims, 8 Drawing Sheets

(51) Int. Cl.
    *G01F 1/696*     (2006.01)
    *G01F 1/86*     (2006.01)
    *G01K 7/00*     (2006.01)
    *G01L 19/00*     (2006.01)
    *G01K 7/24*     (2006.01)

(52) U.S. Cl.
    CPC ............ *G01K 7/24* (2013.01); *G01L 19/0092* (2013.01); *G01N 25/64* (2013.01)

(58) Field of Classification Search
CPC ........ G01N 25/68; G01N 25/70; G01N 19/10; G01N 27/048; G01N 27/121; G01N 27/223; G01N 21/3554; F02D 2200/0418; F24F 2110/20
See application file for complete search history.

(56) References Cited

U.S. PATENT DOCUMENTS

2011/0154885 A1*   6/2011   Nakano ................. G01N 25/18
                                                                 73/25.03
2017/0291600 A1*  10/2017   Styles .................. G07C 5/0825

FOREIGN PATENT DOCUMENTS

| JP | 2011-099757 A | | 5/2011 | |
| JP | 2011-137679 A | | 7/2011 | |
| JP | 2015045515 A | * | 3/2015 | ........... G01F 1/6845 |

* cited by examiner

PRESSURE DEPENDENCE OF HUMIDITY MEASUREMENT VALUE

THERMAL HUMIDITY MEASURING DEVICE

TECHNICAL FIELD

The present invention relates to a thermal humidity measuring device that detects humidity by using a change in thermal conduction based on the moisture content of air.

BACKGROUND ART

As a background art that belongs to the technical field of the present invention, the thermal gas sensor described in JP 2011-137679 A (PTL 1) is known.

The thermal gas sensor described in PTL 1 includes a substrate including a cavity portion, a thin-film support that is stacked in the cavity portion and that is configured by a plurality of insulating layers, and a first heating element and a second heating element that are sandwiched between the insulating layers of the thin-film support. The second heating element is disposed around the first heating element. The first heating element is controlled to a temperature higher than the temperature of the second heating element, and measures the concentration of ambient gas on the basis of power applied to the first heating element (see the summary). In this thermal gas sensor, the second heating element can maintain a gas temperature around the first heating element at a prescribed temperature, and an influence of a change in the gas temperature can be reduced. In addition, the heating elements do not need to be heated to different temperatures in a time-division manner, and response speed can be increased (see paragraph 0012). A driving circuit of the thermal gas sensor described in PTL 1 includes a first bridge circuit that is configured in such a way that a series circuit with the first heating element and a fourth fixed resistor connected together in series is connected in parallel to a series circuit with a fifth fixed resistor and a sixth fixed resistor connected together in series, and a second bridge circuit that is configured in such a way that a series circuit with the second heating element and a first fixed resistor connected together in series is connected in parallel to a series circuit with a second fixed resistor and a third fixed resistor connected together in series (see paragraph 0029).

CITATION LIST

Patent Literature

PTL 1: JP 2011-137679 A

SUMMARY OF INVENTION

Technical Problem

The driving circuit of the thermal gas sensor described in PTL 1 includes the first bridge circuit that includes the first heating element in order to measure the concentration of ambient gas, and the second bridge circuit that includes the second heating element in order to maintain a gas temperature around the first heating element at a prescribed temperature, so that a value of the concentration of ambient gas that is measured by the first heating element is suppressed from changing due to an influence of the gas temperature. In the driving circuit of this thermal gas sensor, the second bridge circuit and the second heating element serving as a component of the second bridge circuit are only used to maintain the gas temperature around the first heating element at a prescribed temperature, and it is not considered to measure information (hereinafter referred to as physical quantity) relating to a state (such as pressure, a flow rate, or temperature) of gas by using the second bridge circuit. Hereinafter, a thermal gas sensor is referred to as a thermal humidity measuring device.

It is an object of the present invention to provide a thermal humidity measuring device that has a configuration including a first heating element and a second heating element and that is capable of obtaining a plurality of measurement values (measured values) including humidity measured by the first heating element, by effectively utilizing each of the heating elements.

Solution to Problem

In order to achieve the object described above, a thermal humidity measuring device according to the present invention includes a first bridge circuit that includes a first heating element that senses humidity, and a second bridge circuit that includes a second heating element that heats air around the first heating element.

In the thermal humidity measuring device, a first output signal is extracted from the first bridge circuit, and the humidity is sensed.

A second output signal is extracted from the second bridge circuit, and the second output signal includes information relating to at least any one of pressure, an air flow rate, and air temperature.

Advantageous Effects of Invention

According to the present invention, by measuring information relating to at least any one of a pressure, a flow rate, and a temperature of air by using the second heating element, a plurality of measurement values (measured values) including humidity measured by the first heating element can be obtained. Problems, configurations, and effects that are not described above will be clarified by the Description of Embodiments described below.

DESCRIPTION OF EMBODIMENTS

A heat radiation amount from a heating element depends on the moisture content of air. A thermal humidity measuring device uses the heat radiation amount from the heating element as a detection signal (a measurement signal). The heat radiation amount changes according to the following four factors, and therefore factors other than (Factor 4) Moisture in air cause an error in humidity measurement.
(Factor 1) Difference in temperature between heating element and air
(Factor 2) Pressure of air around heating element
(Factor 3) Flow of air around heating element
(Factor 4) Moisture in air In a thermal humidity measuring device in a conventional technique, the following countermeasures are taken against factors (1) to (3).

(Countermeasure 1) Air around a heating element is maintained at a constant temperature by using another heating element.

(Countermeasure 2) A pressure sensor is disposed near a heating element, pressure is measured, and a detection signal is corrected.

(Countermeasure 3) A heating element is disposed in a place where there is no flow of air.

In examples of the present invention, in order to realize the countermeasure (Countermeasure 1), a thermal humidity measuring device is provided with a first heating element 4 that senses humidity and a second heating element 10 that maintains the temperature of air around the first heating element 4 to be constant.

Figure 4:
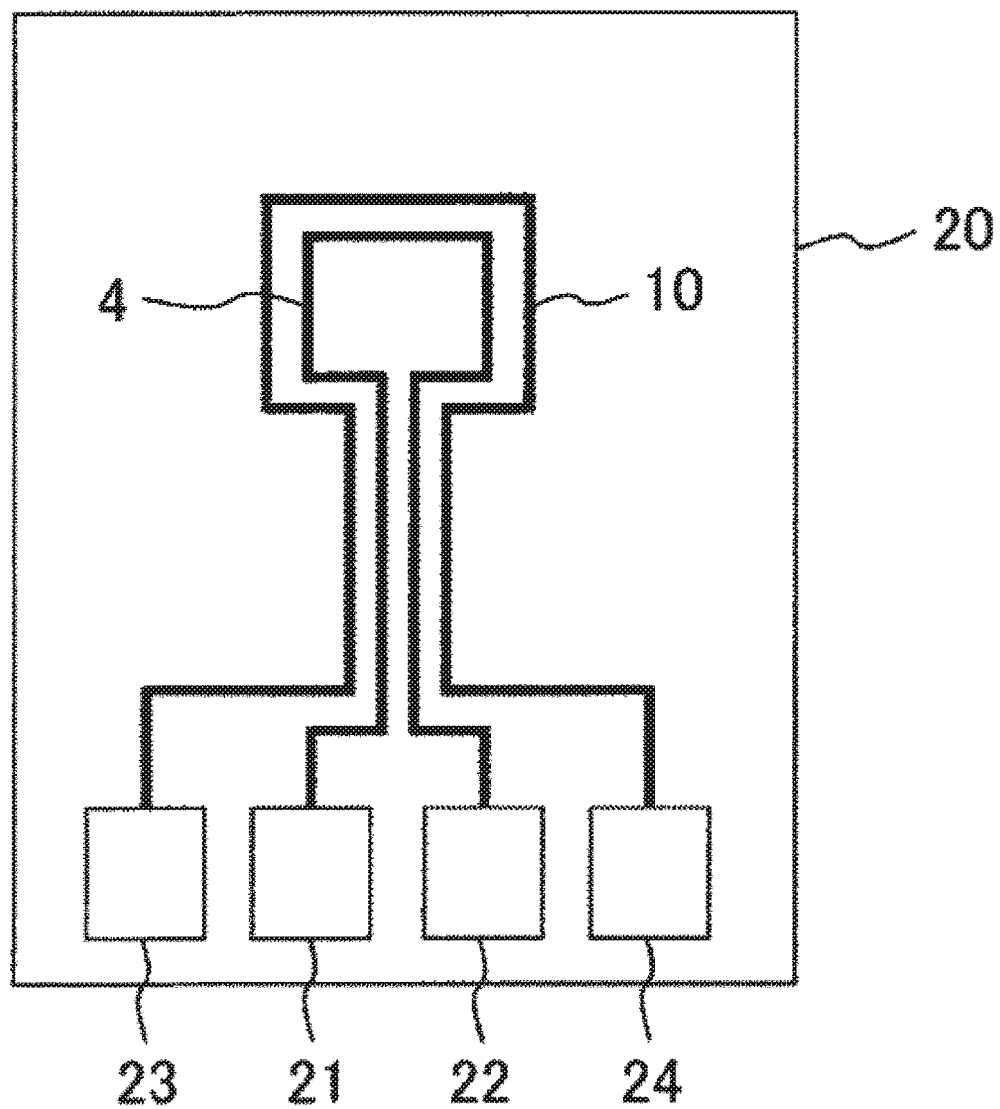
FIG. 4 is a diagram illustrating the disposition of a first heating element and a second heating element in an example of the present invention.

FIG. 4 illustrates an example of the disposition of the first heating element 4 and the second heating element 10.

The second heating element 10 is disposed so as to surround the periphery of the first heating element 4. Electrodes 21 and 22 are provided at both ends of the first heating element 4. Electrodes 23 and 24 are provided at both ends of the second heating element 10.

A relationship between the heat transfer rate of air and humidity has temperature dependence. The heat transfer rate has humidity dependence at an air temperature of 500° C., but has almost no humidity dependence at 350° C. (preferably 300° C.). Therefore, the first heating element 4 is heated to 500° C. to 600° C., and the second heating element is heated to 250° C. to 350° C. In examples of the present invention, the first heating element 4 is heated to 500° C., and the second heating element is heated to 300° C.

By disposing the first heating element 4 and the second heating element 10, as described above and performing temperature control on each of the heating elements 4 and 10, as described above, a difference in temperature between the first heating element 4 and air is maintained to be a constant temperature (200° C.) regardless of the temperature of the outside air.

Figure 1:
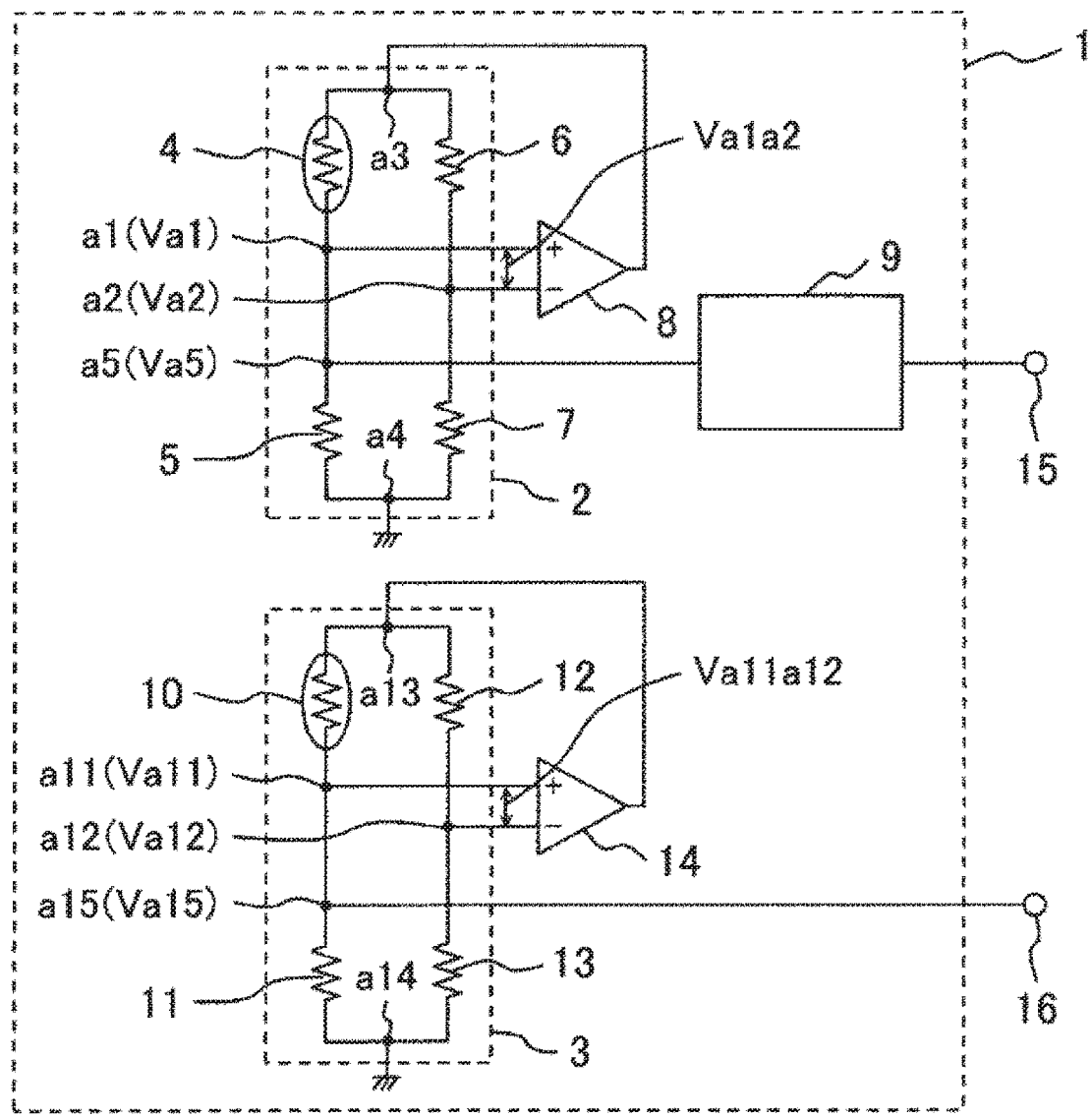
FIG. 1 is a configuration diagram of a thermal humidity measuring device in an example of the present invention.

FIG. 1 illustrates the configuration of a thermal humidity measuring device 1 in an example of the present invention.

A first heating element 4 is an element that detects humidity, and the first heating element 4 is heated to a prescribed temperature by a bridge circuit (a first bridge circuit) 2 that is configured by the first heating element 4, a fixed resistor (a first fixed resistor) 5, a fixed resistor (a second fixed resistor) 6, and a fixed resistor (a third fixed resistor) 7.

In this comparative example, a first series circuit in which the first heating element 4 and the fixed resistor 5 are connected in series to each other is connected in parallel to a second series circuit in which the fixed resistor 6 and the fixed resistor 7 are connected in series to each other, so that the bridge circuit 2 is configured. A potential Va1 of a connecting part a1 between the first heating element 4 and the fixed resistor 5 and a potential Va2 of a connecting part a2 between the fixed resistor 6 and the fixed resistor 7 are input to a differential amplifier 8, a potential difference Va1a2 between the potential Va1 and the potential Va2 is appropriately amplified, and a current that corresponds to the potential difference Va1a2 is supplied to a connecting part a3 between the first heating element 4 and the fixed resistor 6 in the bridge circuit 2. A connecting part a4 between the fixed resistor 5 and the fixed resistor 7 is grounded, and is connected to an earth potential. By doing this, the first heating element 4 is heated to a prescribed temperature.

In a state where the first heating element 4 is maintained at the prescribed temperature, a potential Va5 of a connecting part a5 between the first heating element 4 and the fixed resistor 5 can be extracted as a humidity signal (a humidity signal before the adjustment described later) that corresponds to humidity. The connecting part a5 is a part that is substantially the same as the connecting part a1, and the potential Va5 is the same as the potential Va1.

A humidity signal of the thermal humidity measuring device 1 can be obtained by inputting (connecting) a voltage signal Va5 of the connecting point a5 between the first heating element 4 and the fixed resistor 5 to an output adjusting circuit 9 and adjusting the voltage signal Va5 by using the output adjusting circuit 9. The humidity signal obtained by adjusting the voltage signal Va5 is output from an output terminal 15. The output adjusting circuit 9 is used to adjust an individual variation in a voltage signal of the connecting point a1 between the first heating element 4 and the fixed resistor 5.

A second heating element 10 is an element that heats air around the first heating element 4, and the second heating element 10 is heated to a prescribed temperature by a bridge circuit (a second bridge circuit) 3 that is configured by the second heating element 10, a fixed resistor (a fourth fixed resistor) 11, a fixed resistor (a fifth fixed resistor) 12, and a fixed resistor (a sixth fixed resistor) 13.

In this comparative example, a third series circuit in which the second heating element 10 and the fixed resistor 11 are connected in series to each other is connected in parallel to a fourth series circuit in which the fixed resistor 12 and the fixed resistor 13 are connected in series to each other, so that the bridge circuit 3 is configured. A potential Va11 of a connecting part a11 between the second heating element 10 and the fixed resistor 11 and a potential Va12 of a connecting part a12 between the fixed resistor 6 and the fixed resistor 7 are input to a differential amplifier 14, a potential difference Va11a12 between the potential Va11 and the potential Va12 is appropriately amplified, and a current that corresponds to the potential difference Va11a12 is supplied to a connecting part a13 between the second heating element 10 and the fixed resistor 11 in the bridge circuit 3. The connecting part a5 is a part that is substantially the same as the connecting part a1, and the potential Va5 is the same as the potential Va1. By doing this, the first heating element 4 is heated to a prescribed temperature.

In a state where the second heating element 10 is maintained at the prescribed temperature, heat generated in the second heating element 10 is radiated to ambient air, and its heat radiation amount changes according to a state (such as pressure, a flow rate, or temperature) of the ambient air. A change in the heat radiation amount due to a change in the state of air changes a potential Va15 of a connecting part a15 between the second heating element 10 and the fixed resistor 11. Accordingly, the potential Va15 of the connecting part a15 can be used as information (hereinafter referred to as physical quantity) relating to the state (such as pressure, a flow rate, or temperature) of air.

In addition, the extraction of the potential Va15 of the connecting part a15 means the detection of a current (a current value) that flows through the second heating element 10.

Figure 2:
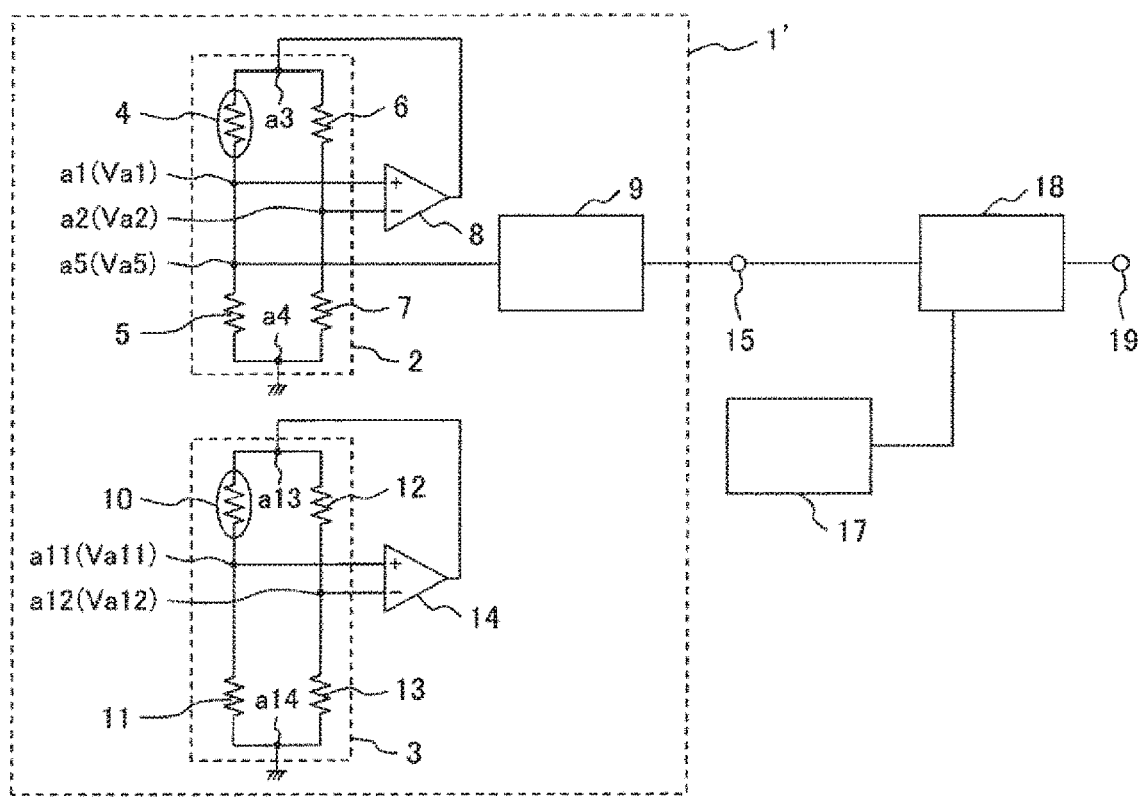
FIG. 2 is a configuration diagram of a thermal humidity measuring device in a comparative example of the present invention.

FIG. 2 illustrates the configuration of a thermal humidity measuring device 1' in a comparative example of the present invention.

In the comparative example of FIG. 2, a first heating element 4 is disposed in a place where there is no flow of ambient air ((Countermeasure 3) described above), and countermeasures are taken against a humidity output error due to the flow of air. In addition, a pressure sensor 17 is disposed, a signal processing circuit 18 performs a correction operation on a pressure signal of ambient air and a humidity signal from an output terminal 15, and countermeasures are taken against a humidity output error due to pressure.

In the comparative example of FIG. 2, a signal is not extracted from a bridge circuit 3 to an outside of the thermal humidity measuring device 1. Accordingly, the bridge circuit 3 is only provided in order to heat air around the first heating element to a prescribed temperature.

In contrast, in the thermal humidity measuring device 1 illustrated in FIG. 1 in an example of the present invention, a signal is extracted from the bridge circuit 3, and is output from the output terminal 16 to an outside of the thermal humidity measuring device 1. The signal from the bridge circuit 3 includes information relating to a flow (a flow rate), a pressure, and a temperature of air around the thermal humidity measuring device 1, and therefore the signal from the bridge circuit 3 can be utilized as a signal that outputs the information.

An example in which a signal (information) obtained from the output terminal 16 is used as a correction signal that corrects a humidity signal obtained from the bridge circuit 2 will be described below while being divided into examples 1 to 5. In some cases, the humidity signal obtained from the bridge circuit 2 is referred to as a first output signal, and a signal obtained from the bridge circuit 3 (a signal obtained from the output terminal 16) is referred to as a second output signal.

Example 1

Figure 3:
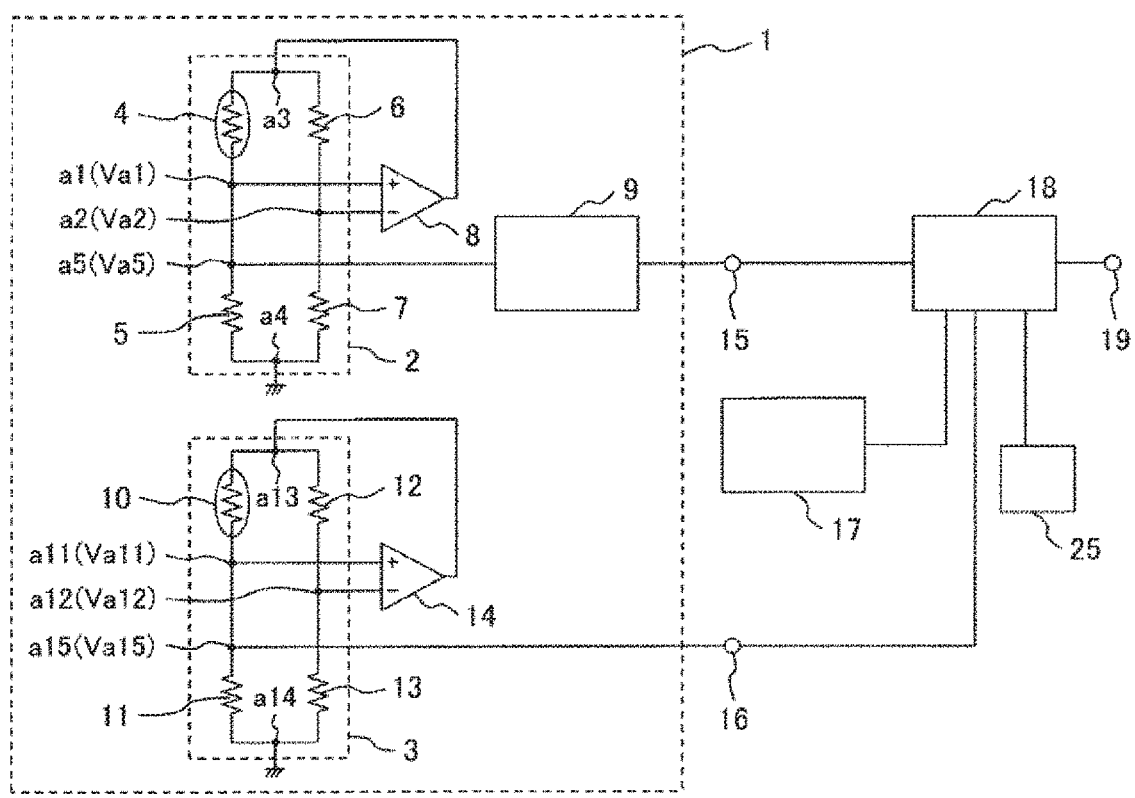
FIG. 3 is a configuration diagram of a thermal humidity measuring device according to the present invention, and is a configuration diagram illustrating an example of a thermal humidity measuring device that performs air flow rate correction.

FIG. 3 illustrates an example of a thermal humidity measuring device 1 that performs air flow rate correction.

The thermal humidity measuring device 1 of FIG. 3 indicates an example in a case where an influence (an error) of an air flow that is included in a humidity signal obtained from a bridge circuit 2 is corrected by using a voltage output (a potential of a connecting part a15) Va15 from a bridge circuit 3 as a signal of the flow of air around the thermal humidity measuring device 1.

In this example, a pressure sensor 17 that detects ambient pressure, a signal processing circuit (a signal processor) 18 that corrects an error included in the humidity signal, and a temperature sensor 25 that detects ambient temperature are included in addition to the thermal humidity measuring device 1 of FIG. 1. A configuration may be employed in which any one of the pressure sensor 17, the signal processing circuit 18, and the temperature sensor 25, any two of them, or all of them are included in the thermal humidity measuring device 1.

A humidity signal output from an output terminal 15, a pressure signal output from the pressure sensor 17, a signal output from an output terminal 16, and a temperature signal output from the temperature sensor 25 are input to the signal processing circuit 18. As described above, the signal output from the output terminal 16 includes information (components) relating to an air flow rate, pressure, and temperature. The signal processing circuit 18 performs correction so as to remove a pressure component and a temperature component that are included in the signal (a second output signal) output from the output terminal 16 by using the pressure signal output from the pressure sensor 17 and the temperature signal output from the temperature sensor 25. By doing this, the signal processing circuit 18 can extract an air flow rate component (an air flow rate signal) included in the second output signal.

The signal processing circuit 18 corrects a humidity output error (an error of a first output signal) due to a change in pressure and the flow of air by using the pressure signal and the extracted air flow rate signal, and outputs a humidity signal on which correction processing has been performed from an output terminal 19. Not only the humidity signal but also the pressure signal and the temperature signal can be output simultaneously or in a time-division manner from the output terminal 19.

Figure 8:
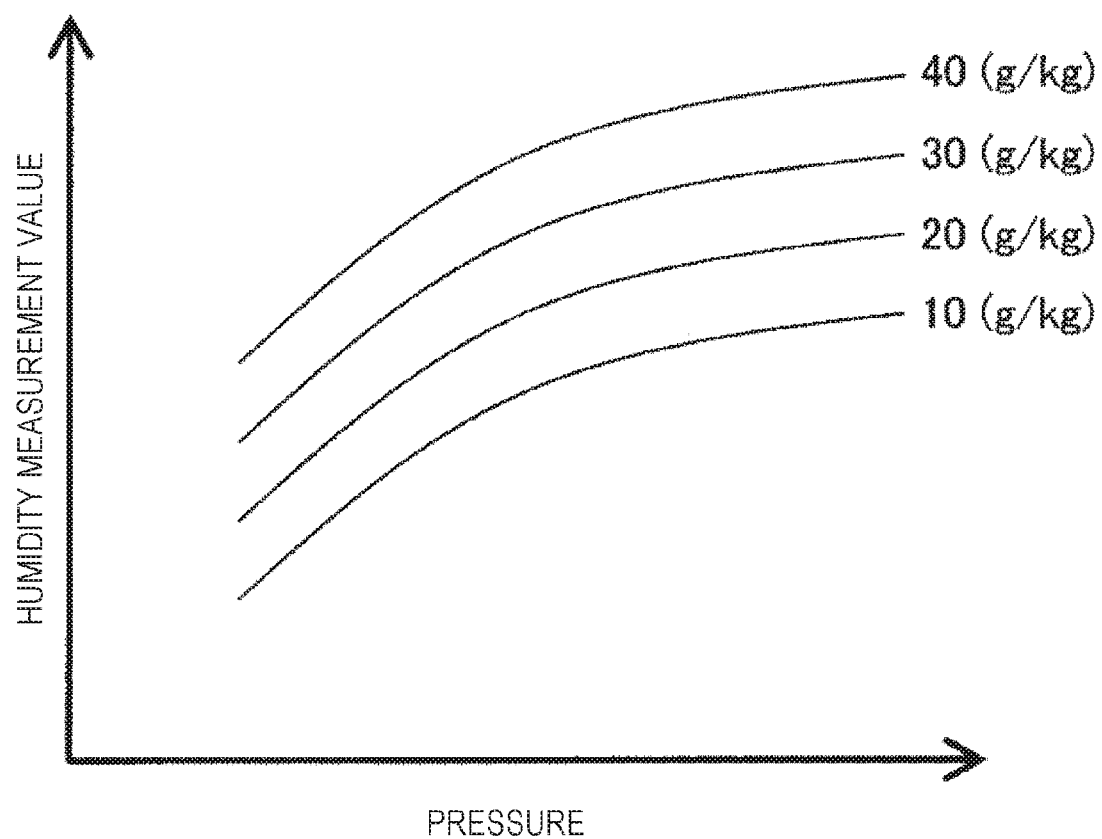
FIG. 8 illustrates the pressure dependence of a humidity measurement value.

FIG. 8 illustrates the pressure dependence of a humidity measurement value.

The thermal humidity measuring device 1 in this example outputs an absolute humidity as a measurement value. The absolute humidity in this example is defined as a weight ratio of moisture content with respect to air to be measured and specifically the mass of moisture included in 1 kg of air to be measured.

A humidity measurement value serving as an output of the thermal humidity measuring device 1 has pressure dependence. Therefore, when the absolute humidity is identical but pressure changes, the humidity measurement value also changes, as illustrated in FIG. 8. Examples of a method for specifying (correcting) the absolute humidity include a method for calculating the absolute humidity using an approximate expression of a pressure dependence characteristic of the humidity measurement value, as illustrated in FIG. 8 and a method for reading the absolute humidity stored on two-dimensional coordinates.

The approximate expression and the two-dimensional coordinates storing the absolute humidity that are used in the method described above are stored in a storage circuit (a storage) 26. A configuration may be employed in which the storage circuit 26 is included in the thermal humidity measuring device 1.

The humidity measurement value also has dependence on temperature and an air flow rate. Therefore, for these dependences, similarly to pressure dependence, approximate expressions of dependence characteristics or two-dimensional coordinates are stored in the storage circuit 26, and correction is performed so as to specify an absolute humidity with respect to each temperature and each air flow rate.

In this example, a measurement error generated due to the flow of air around the first heating element 4 can be corrected. Therefore, the first heating element 4 can be disposed in a place where the flow of air is generated. As a result, the first heating element 4 can be disposed in a place where ambient air is likely to be exchanged, and a thermal humidity measuring device 1 having both a high accuracy and a high-speed response can be realized. In FIG. 3, in a case where an influence of temperature is negligible, a configuration in which the temperature sensor 25 is not disposed is also a target of this example.

Example 2

Figure 5:
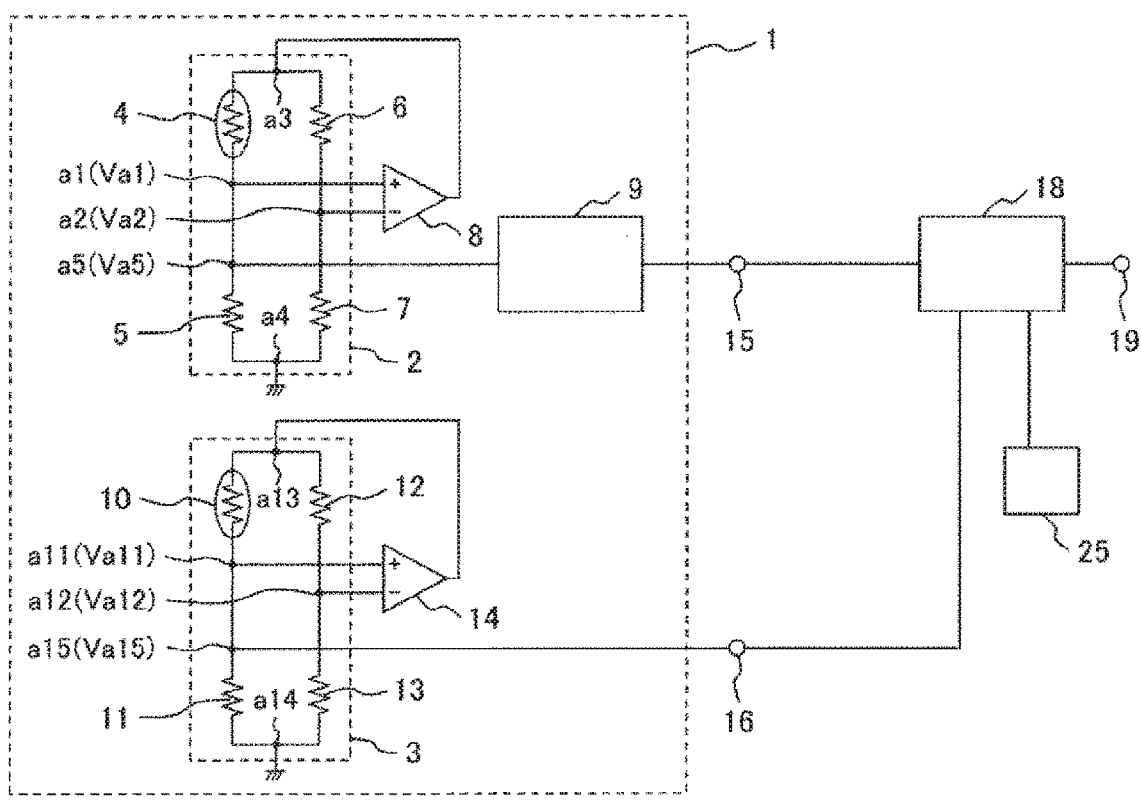
FIG. 5 is a configuration diagram of a thermal humidity measuring device according to the present invention, and is a configuration diagram illustrating an example of a thermal humidity measuring device that performs pressure correction.

FIG. 5 illustrates an example of a thermal humidity measuring device 1 that performs pressure correction.

The thermal humidity measuring device 1 of FIG. 5 indicates an example in a case where an influence (an error) of pressure that is included in a humidity signal obtained from a bridge circuit 2 is corrected by using a voltage output (a potential of a connecting part a15) Va15 from a bridge circuit 3 as a signal of the pressure of air around the thermal humidity measuring device 1. In this example, assume that a first heating element 4 and a second heating element 10 are disposed in an environment (a space) in which the flow of air is negligible. Such a space can be realized by a cavity portion that is similar to the cavity portion described in PTL 1.

In this example, a signal processing circuit (a signal processor) 18 that corrects an error included in the humidity signal and a temperature sensor 25 that detects ambient temperature are included in addition to the thermal humidity measuring device 1 of FIG. 1. A configuration may be employed in which any one of the signal processing circuit 18 and the temperature sensor 25 or all of them are included in the thermal humidity measuring device 1.

A humidity signal output from an output terminal 15, a signal output from an output terminal 16, and a temperature signal output from the temperature sensor 25 are input to the signal processing circuit 18.

As described above, the signal output from the output terminal 16 includes information (components) relating to an air flow rate, pressure, and temperature. The signal processing circuit 18 performs correction so as to remove a temperature component that is included in the signal (a second output signal) output from the output terminal 16 by using the temperature signal output from the temperature sensor 25. By doing this, the signal processing circuit 18 can extract a pressure component (a pressure signal) included in the second output signal.

The signal processing circuit 18 corrects a humidity output error (an error of a first output signal) due to a change in temperature and a change in pressure by using the temperature signal and the extracted pressure signal, and outputs a humidity signal from an output terminal 19. Not only the humidity signal but also the pressure signal and the temperature signal can be output simultaneously or in a time-division manner from the output terminal 19.

In the case of this example, the first heating element 4 needs to be disposed in a place where there is no flow of air, but a pressure sensor 17 can be omitted. Therefore, an inexpensive thermal humidity measuring device can be realized. In FIG. 5, in a case where an influence of temperature is negligible, a configuration in which the temperature sensor 25 is not disposed is also a target of this example.

Example 3

Figure 6:
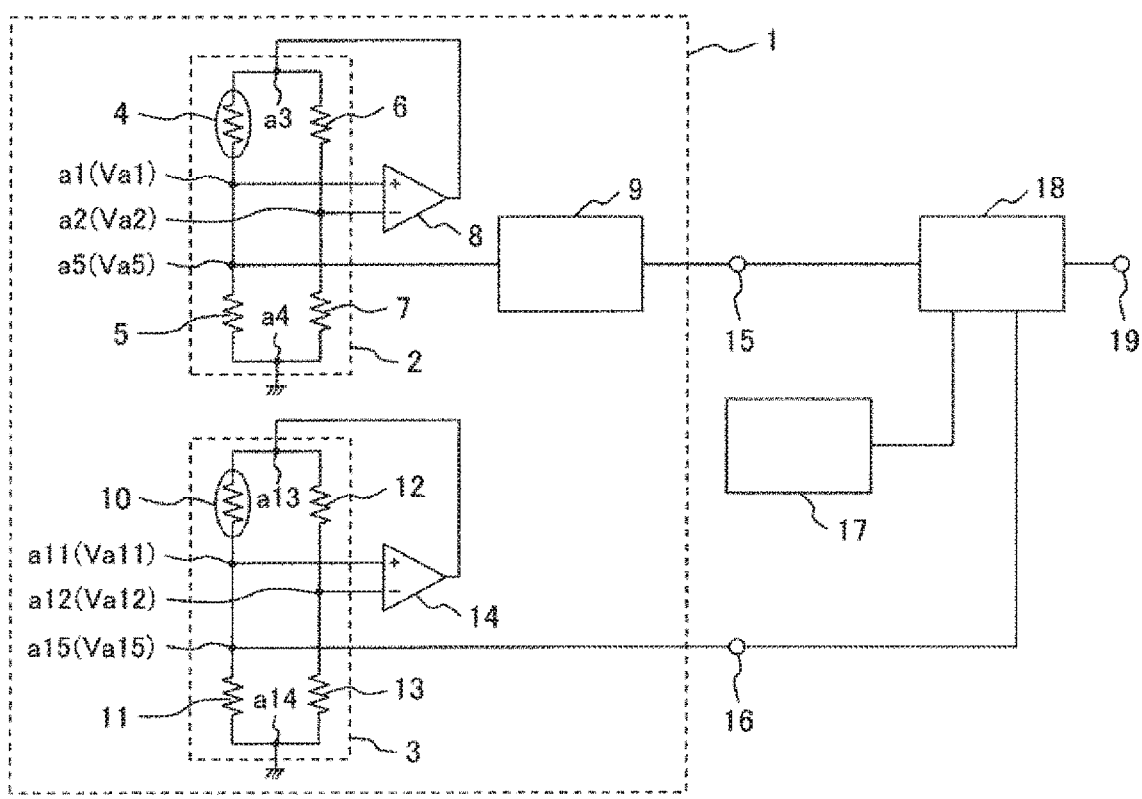
FIG. 6 is a configuration diagram of a thermal humidity measuring device according to the present invention, and is a configuration diagram illustrating an example of a thermal humidity measuring device that outputs a temperature signal.

FIG. 6 illustrates an example of a thermal humidity measuring device 1 that outputs a temperature signal.

The thermal humidity measuring device 1 of FIG. 6 is an example in a case where a voltage output (a potential of a connecting part a15) Va15 from a bridge circuit 3 is used as a signal of the temperature of air around the humidity measuring device 1. In this example, assume that a first heating element 4 and a second heating element 10 are disposed in an environment (a space) in which the flow of air is negligible.

In this example, the first heating element 4 is disposed in a place where there is no flow of air, and a pressure sensor 17 is provided. By correcting a humidity output error (an error of a first output signal) by using a pressure signal output from the pressure sensor 17, a highly accurate humidity signal in which a humidity output error due to a change in pressure has been corrected can be output from an output terminal 19 from an output terminal 19. In this case, a humidity output error due to a change in an air flow rate does not exist or is negligibly small, and therefore the humidity output error does not need to be corrected.

In this case, a signal (a second output signal) from an output terminal 16 does not need to be used to correct a humidity signal. However, the signal from the output terminal 16 also includes a temperature signal, and therefore the signal from the output terminal 16 can be used as an air temperature signal rather than a signal used to correct the humidity signal. However, the second output signal also includes a component (a signal) of a change in pressure. Therefore, the second output signal is input to a signal processing circuit 18, the component of the change in pressure is removed from the second output signal, and the temperature signal is extracted. By doing this, the humidity signal, the pressure signal, and the temperature signal can be output simultaneously or in a time-division manner from the output terminal 19.

Figure 7:
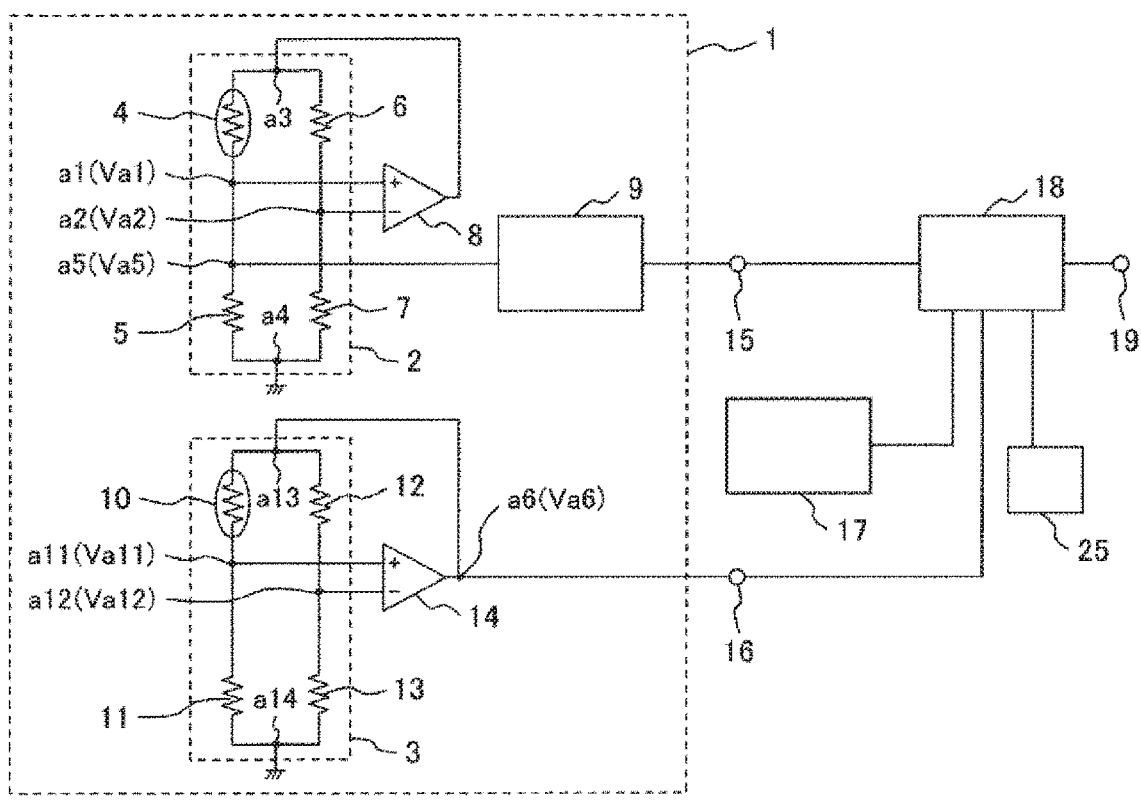
FIG. 7 is a configuration diagram of a thermal humidity measuring device in an example of the present invention.

In the thermal humidity measuring devices 1 of FIG. 1 and example 1 to example 3, a signal from the bridge circuit 2 is obtained from the connecting part a5 between the second heating element 10 and the fixed resistor 11, but a signal (Va6) may be obtained from an output terminal a6 of a differential amplifier 14, as illustrated in FIG. 7.

In a thermal humidity measuring device, an output also changes according to the flow of air or the pressure of ambient air other than the moisture content of air or a difference in temperature between air and a heating element that measures humidity, and this causes an error in humidity measurement. Therefore, in the thermal humidity measuring device, measures need to be taken, for example, by disposing the heating element that measures humidity in a place where there is no flow of air or by measuring the pressure of ambient air using a pressure measuring device that is disposed near the thermal humidity measuring device and correcting an output signal (a measurement value).

In view of the problem described above, PTL 1 describes a composite sensor in which a thermal gas sensor is integrated with a thermal air flow rate sensor, and in the composite sensor, the thermal gas sensor is provided in a cavity portion of a housing that is in communication with a sub-passage in which the thermal air flow rate sensor is provided (see paragraph 0088). Stated another way, in the composite sensor described in PTL 1, by disposing the thermal gas sensor in the cavity portion of the housing, the thermal gas sensor is disposed in a place (the cavity portion) where there is no flow of air.

However, when a heating element that measures humidity is disposed in a place where there is no flow of air, it becomes difficult to exchange air, and this causes a problem wherein responsiveness to a change in humidity deteriorates.

A thermal humidity measuring device that measures the environment of an intake passage of an internal combustion engine needs to measure the humidity of gas in real time. Therefore, it is desirable that the thermal humidity measuring device have high-speed response performance (hereinafter referred to as a high-speed response). In order to achieve the high-speed response, it is desirable that a humidity detecting element be exposed to the intake passage. However, in a case where the humidity detecting element is exposed to the intake passage, an intake pulses due to a high-speed rotation operation of the internal combustion engine, and the measurement of humidity is adversely affected by turbulence. Therefore, a heating element that measures humidity needs to be disposed in a place where there is no flow of air or a place where an air flow rate is small, and it is difficult to achieve both highly accurate measurement with less noise and a high-speed response in the thermal gas sensor described in PTL 1.

In addition, there is a problem wherein a product price increases when a configuration is employed in which a pressure sensor that corrects an influence of pressure on a humidity signal is disposed.

In an example in which a first output signal (a humidity signal) is corrected by using a second output signal from among the examples described above, even in an environment in which an intake pulses, for example, due to a high-speed rotation operation of an internal combustion engine, a humidity measuring device can be provided that is capable of measuring humidity while achieving both a high accuracy and a high-speed response, and an inexpensive thermal humidity measuring device can also be provided.

The present invention is not limited to the respective examples described above, and includes various variations. For example, the examples above have been descried in detail in order to make the present invention easily understandable, and the present invention is not limited to an example that has the entirety of a configuration. In addition, part of a configuration in a certain example can be replaced with a configuration in another example, or a configuration in a certain example can be added to a configuration in another example. Further, the addition, deletion, or replacement of a configuration in another example can be made to part of a configuration in each of the examples.

REFERENCE SIGNS LIST 1 thermal humidity measuring device
2 bridge circuit that drives first heating element
3 bridge circuit that drives second heating element
4 first heating element
5, 6, 7 fixed resistor
8 differential amplifier
9 output adjusting circuit
10 second heating element
11, 12, 13 fixed resistor
14 differential amplifier
15, 16 output terminal
17 pressure sensor
18 signal processing circuit
19 output terminal
20 substrate
21, 22, 23, 24 electrode
25 temperature sensor
26 storage

The invention claimed is:

1. A thermal humidity measuring device comprising:
a first bridge circuit that includes a first heating element that senses humidity; and
a second bridge circuit that includes a second heating element that heats air around the first heating element;
wherein a first output signal is extracted from the first bridge circuit, the first output signal associated with a sensed humidity;
wherein the first output signal is obtained by inputting a first voltage signal to an output adjusting circuit, the first voltage signal being determined at a first connecting point between the first heating element and a fixed resistor, and wherein the output adjusting circuit is connected to the first bridge circuit and configured to adjust a variation in a second voltage signal, the second voltage signal being determined at a second connecting point between the first heating element and the fixed resistor; and
wherein a second output signal is extracted from the second bridge circuit, the second output signal including information relating to at least any one of pressure, an air flow rate, and air temperature.

2. The thermal humidity measuring device according to claim 1, further comprising:
a signal processor that corrects an error included in the first output signal;
a pressure sensor that detects ambient pressure; and
a temperature sensor that detects ambient temperature; and
wherein the signal processor extracts an air flow rate signal from the second output signal by removing a pressure component of the second output signal based on an output of the pressure sensor and removing a temperature component of the second output signal based on an output of the temperature sensor, and corrects the first output signal by using the output of the pressure sensor and the air flow rate signal.

3. The thermal humidity measuring device according to claim 1, further comprising:
a signal processor that corrects an error included in the first output signal and a temperature sensor that detects ambient temperature;
wherein the signal processor extracts a pressure signal from the second output signal by removing a temperature component of the second output signal based on an output of the temperature sensor, and corrects the first output signal by using the pressure signal; and
wherein the first heating element and the second heating element are disposed in a space in which air flow is lower than air flow outside the space.

4. The thermal humidity measuring device according to claim 1, further comprising:
a signal processor that corrects an error included in the first output signal and a pressure sensor that detects ambient pressure;
wherein the signal processor extracts a temperature signal from the second output signal by removing a pressure component of the second output signal based on an output of the pressure sensor and corrects the error included in the first output signal by using an output of the pressure sensor; and
wherein the first heating element and the second heating element are disposed in a space in which air flow is lower than air flow outside the space.

5. The thermal humidity measuring device according to claim 1, wherein the first output signal is obtained from a first output terminal and the second output signal is obtained from a second output terminal.

6. The thermal humidity measuring device according to claim 5, wherein each of the first output terminal and the second output terminal are connected to a signal processing circuit, wherein the signal processing unit outputs a corrected humidity signal at a third output terminal, and wherein the first output terminal is connected to the output adjusting circuit.

7. The thermal humidity measuring device according to claim 6, wherein the first heating element is heated to a temperature ranging from 500° C. to 600° C. and the second heating element is heated to a temperature ranging from 250° C. to 350° C.

8. The thermal humidity measuring device according to claim 7, wherein the first heating element is heated to 500° C. and the second heating element is heated to 300° C.

* * * * *